(12) United States Patent
Wei et al.

(10) Patent No.: US 12,020,473 B2
(45) Date of Patent: Jun. 25, 2024

(54) PEDESTRIAN RE-IDENTIFICATION METHOD, DEVICE, ELECTRONIC DEVICE AND COMPUTER-READABLE STORAGE MEDIUM

(71) Applicant: Shenzhen Intellifusion Technologies Co., Ltd., Shenzhen (CN)

(72) Inventors: Xinming Wei, Shenzhen (CN); Xiaoyu Wang, Shenzhen (CN)

(73) Assignee: SHENZHEN INTELLIFUSION TECHNOLOGIES CO., LTD., Shenzhen (CN)

( * ) Notice: Subject to any disclaimer, the term of this patent is extended or adjusted under 35 U.S.C. 154(b) by 566 days.

(21) Appl. No.: 17/258,162

(22) PCT Filed: Oct. 30, 2019

(86) PCT No.: PCT/CN2019/114333
§ 371 (c)(1),
(2) Date: Dec. 9, 2021

(87) PCT Pub. No.: WO2020/125216
PCT Pub. Date: Jun. 25, 2020

(65) Prior Publication Data
US 2022/0101644 A1 Mar. 31, 2022

(30) Foreign Application Priority Data
Dec. 18, 2018 (CN) .......................... 201811550892.7

(51) Int. Cl.
*G06V 10/00* (2022.01)
*G06N 3/045* (2023.01)
(Continued)

(52) U.S. Cl.
CPC ............. *G06V 10/82* (2022.01); *G06N 3/045* (2023.01); *G06N 3/08* (2013.01); *G06V 10/774* (2022.01); *G06V 40/10* (2022.01)

(58) Field of Classification Search
CPC ........ G06N 3/08; G06N 3/0454; G06N 3/045; G06N 3/02; G06N 3/092; G06N 3/0475;
(Continued)

(56) References Cited

U.S. PATENT DOCUMENTS 9,008,365 B2 * 4/2015 Xu .......................... G06V 10/50
382/103
9,349,043 B2 * 5/2016 Ryu ........................ G06V 10/50
(Continued)

FOREIGN PATENT DOCUMENTS

CN 106257489 A 12/2016
CN 107784282 A 3/2018
(Continued)

*Primary Examiner* — Amir Alavi
(74) *Attorney, Agent, or Firm* — Jose Cherson Weissbrot

(57) ABSTRACT

A method and apparatus for pedestrian re-identification, an electronic device, and a computer-readable storage medium are provided. The method includes that: a pedestrian image to be detected is acquired; global feature information of the pedestrian image to be detected is extracted through multiple convolutional layers of a convolutional neural network; multiple pieces of intermediate feature information of the pedestrian image to be detected are extracted through the multiple convolutional layers of the convolutional neural network respectively, and the multiple pieces of intermediate feature information are merged as local feature information; and the global feature information and the local feature information are assigned as a classification feature of the pedestrian image to be detected, and a classification result of the pedestrian image to be detected is determined according to the classification feature.

7 Claims, 8 Drawing Sheets

(51) Int. Cl.
*G06N 3/08* (2023.01)
*G06V 10/774* (2022.01)
*G06V 10/82* (2022.01)
*G06V 40/10* (2022.01)

(58) Field of Classification Search
CPC ...... G06N 3/042; G06N 3/082; G06N 3/0464; G06N 3/049; G06V 10/82; G06V 10/774; G06V 10/42; G06V 10/454; G06V 10/24; G06V 40/10; G06T 2207/20081; G06T 2207/20084
See application file for complete search history.

(56) References Cited

U.S. PATENT DOCUMENTS

| | | | | |
|---|---|---|---|---|
| 9,477,882 B2* | 10/2016 | Haraguchi | ............ | G06V 10/443 |
| 9,852,340 B2* | 12/2017 | Mai | ................ | G06V 40/10 |
| 10,131,278 B2* | 11/2018 | Nagano | ................ | H04N 25/76 |
| 10,503,966 B1* | 12/2019 | Pan | ................ | G06V 10/764 |
| 10,650,249 B2* | 5/2020 | Zhang | ................ | G06T 7/11 |
| 11,302,110 B2* | 4/2022 | Hayakawa | ............ | G06V 20/52 |
| 11,680,801 B2* | 6/2023 | Benou | ............ | G06F 18/24133 |
| | | | | 701/301 |
| 11,699,290 B1* | 7/2023 | Wang | ................ | G06T 7/90 |
| | | | | 382/103 |
| 2020/0250461 A1* | 8/2020 | Yang | ................ | G06V 10/40 |
| 2022/0101644 A1* | 3/2022 | Wei | ................ | G06V 10/82 |

FOREIGN PATENT DOCUMENTS

| | | |
|---|---|---|
| CN | 108717520 A | 10/2018 |
| CN | 108985295 A | 12/2018 |
| CN | 109784186 A | 5/2019 |

* cited by examiner

PEDESTRIAN RE-IDENTIFICATION METHOD, DEVICE, ELECTRONIC DEVICE AND COMPUTER-READABLE STORAGE MEDIUM

CROSS-INTERFERENCE TO RELATED APPLICATIONS

The present application claims priority to Chinese Patent Application No. 201811550892.7, filed on Dec. 18, 2018, and entitled "Method and Apparatus for pedestrian re-identification, Electronic Device, and Computer-Readable Storage Medium", the disclosure of which is hereby incorporated by reference in its entirety.

TECHNICAL FIELD

The disclosure relates to the technical field of image processing, and particularly to a method and apparatus for pedestrian re-identification, an electronic device, and a computer-readable storage medium.

BACKGROUND

In recent years, social public security has attracted more and more attentions, and video monitoring systems have been popularized. For example, public places such as an airport, a railway station, a campus and an office building are required to be monitored to ensure security. Faced with massive monitoring video data, lots of human resources are required to be invested in monitoring and retrieval of video information. Such a manner is low in efficiency and also brings additional resource wastes. If a computer vision analysis technology may be adopted to analyze video information of automatic monitoring, construction of "safe cities" may be greatly accelerated.

With the rapid development of deep learning and achievement of great success in the related fields of face recognition, particularly extensive application of convolutional neural networks to face recognition, development of pedestrian re-identification has also been promoted. Unlike face recognition, pedestrian re-identification is confronted with more problems, has knottier problems required to be solved and thus is confronted with greater challenges, for example, lack of an identifiable feature for classification due to an angle of a pedestrian image, a resolution of the image and an incapability of acquiring a front face image. Consequently, present convolutional neural network-based pedestrian re-identification is relatively low in identification accuracy.

SUMMARY

Embodiments of the disclosure provide a method for pedestrian re-identification. By implementing the embodiments of the disclosure, features of multiple layers and multiple scales of a face image are fused to obtain a more identifiable feature, so that the pedestrian re-identification accuracy is improved.

In a first aspect, the disclosure provides a method for pedestrian re-identification, which includes that:
a pedestrian image to be detected is acquired;
global feature information of the pedestrian image to be detected is extracted through multiple convolutional layers of a convolutional neural network;
multiple pieces of intermediate feature information of the pedestrian image to be detected are extracted through the multiple convolutional layers of the convolutional neural network respectively, and the multiple pieces of intermediate feature information are merged as local feature information, the multiple pieces of intermediate feature information each corresponds to one of the multiple convolutional layers; and
the global feature information and the local, feature information are assigned as a classification feature of the pedestrian image to be detected, and a classification result of the pedestrian image to be detected is determined according to the classification feature.

In a second aspect, the embodiments of the disclosure provide an apparatus for pedestrian re-identification, which includes:
an acquisition unit, configured to acquire a pedestrian image to be detected;
a first extraction unit, configured to extract global feature information of the pedestrian image to be detected through multiple convolutional layers of a convolutional neural network;
a second extraction unit, configured to extract multiple pieces of intermediate feature information of the pedestrian image to be detected through the multiple convolutional layers of the convolutional neural network respectively and merge the multiple pieces of intermediate feature information as local feature information, the multiple pieces of intermediate feature information each corresponds to a one of the multiple convolutional layers; and
a determination unit, configured to assign the global feature information and the local feature information as a classification feature of the pedestrian image to be detected and determine a classification result of the pedestrian image to be detected according to the classification feature.

In a third aspect, the embodiments of the disclosure provide an electronic device, which is characterized by including a processor, an input/output device and a memory, wherein the processor, the input/output device and the memory are connected with one another; the memory is configured to store an application program code; the input/output device is configured for data interaction with another device; and the processor is configured to call the program code to execute the steps of the method for pedestrian re-identification as described in any embodiment of the disclosure.

In a fourth aspect, the embodiments of the disclosure provide a computer-readable storage medium, which stores a computer program, wherein the computer program includes a program instruction, and when the program instruction is executed by a processor, the processor executes the steps of the method for pedestrian re-identification as described in any embodiment of the disclosure.

Based on the method and apparatus for pedestrian re-identification, electronic device, and computer-readable storage medium provided in the embodiments of the disclosure, the pedestrian image to be detected is acquired, the global feature information of the pedestrian image to be detected is extracted through the multiple convolutional layers of the convolutional neural network, the multiple pieces of intermediate feature information of the pedestrian image to be detected are extracted through the multiple convolutional layers of the convolutional neural network, the multiple pieces of intermediate information are merged as the local feature information, and finally, the classification result of the pedestrian image to be detected is determined based on the global feature information and the local feature information. By implementing the embodiments of the disclosure, features of multiple layers and multiple scales of the pedestrian image are fused, and a more identifiable feature is obtained based on a global feature and local feature of the pedestrian image, so that the pedestrian re-identification accuracy is improved.

BRIEF DESCRIPTION OF THE DRAWINGS

In order to describe the technical solutions in the embodiments of the disclosure more clearly, the drawings required to be used for describing the embodiments will be simply introduced below. It is apparent that the drawings described below are some embodiments of the disclosure. Those of ordinary skill in the art may further obtain other drawings according to these drawings without creative work.

DETAILED DESCRIPTION OF THE EMBODIMENTS

Figure 1:
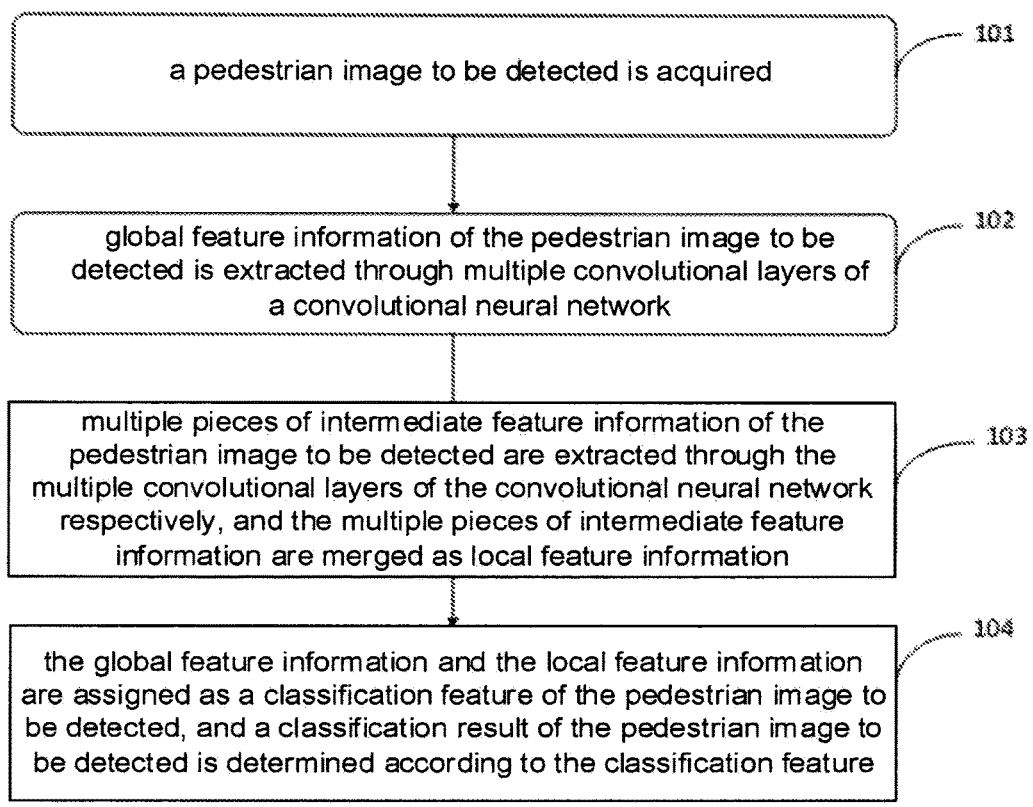
FIG. 1 is a schematic flowchart of a method for pedestrian re-identification according to an embodiment of the disclosure.

An embodiment of the disclosure provides a method for pedestrian re-identification. Referring to FIG. 1, FIG. 1 is a schematic flowchart of a method for pedestrian re-identification according to an embodiment of the disclosure. As shown in FIG. 1, the method includes the following steps.

In 101, a pedestrian image to be detected is acquired.

Figure 2:
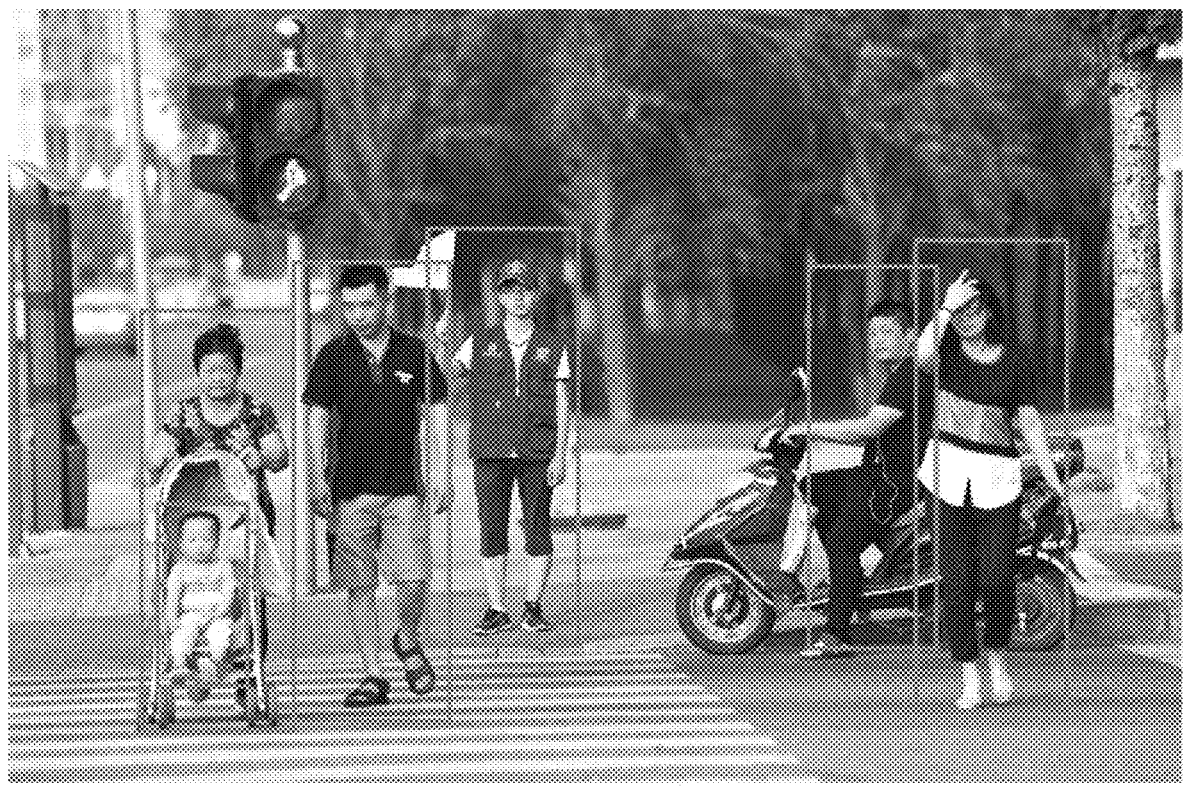
FIG. 2 is a pedestrian image with rectangular box labels according to an embodiment of the disclosure.

In an embodiment of the method for pedestrian re-identification of the disclosure, the pedestrian image to be detected may be an image including one or more pedestrians. The pedestrian image to be detected may be a pedestrian image with rectangular box labels or without any rectangular box label. The pedestrian image with the rectangular box labels is shown in FIG. 2. FIG. 2 is a pedestrian image with rectangular box labels according to an embodiment of the disclosure. It may be seen from FIG. 2 that the pedestrian image with the rectangular box labels is an image where pedestrians in the image are labeled with rectangular boxes. Using the pedestrian image with the rectangular box labels as the pedestrian image to be detected makes it convenient for a convolutional neural network to rapidly recognize positions of the pedestrians in the pedestrian image in the image. If the pedestrian image to be detected is a pedestrian image without any rectangular box label, it is necessary for the convolutional neural network to perform positioning processing on the pedestrians in the pedestrian image to be detected at first.

Optionally, the acquired pedestrian image to be detected may be a static picture, such as a picture in a common format like JPEG, TIFF. BMP, GIF, PNG and RAW. The format of the picture is not limited in the disclosure. In addition, the pedestrian image to be detected may also be a frame captured from a video stream or a picture in an image sequence.

In 102, global feature information of the pedestrian image to be detected is extracted through multiple convolutional layers of a convolutional neural network.

Figure 3:
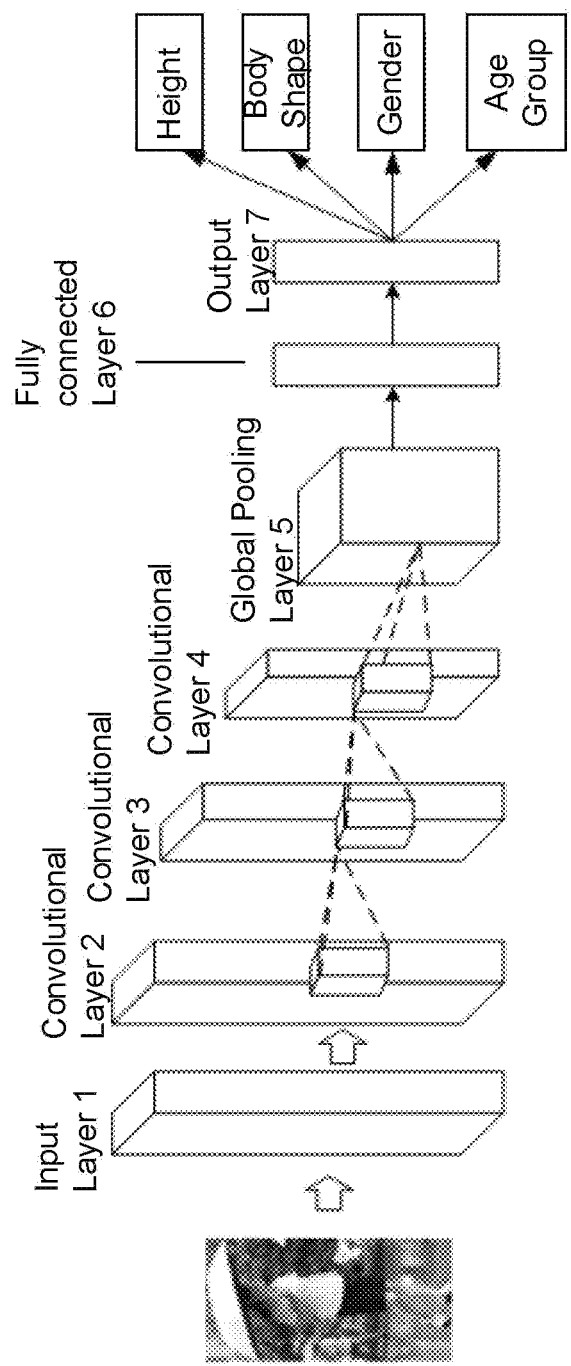
FIG. 3 is a schematic diagram of a process of extracting a global feature of a pedestrian image according to an embodiment of the disclosure.

In an embodiment of the method for pedestrian re-identification of the disclosure, the convolutional neural network is constructed. The global feature information of the pedestrian image to be detected may be extracted through the multiple convolutional layers, of the convolutional neural network. A structure of the convolutional neural network refers to FIG. 3. The convolutional neural network includes an input layer 1, three convolutional layers 2 to 4, a pooling layer 5, a fully connected layer 6 and an output layer 7, which are sequentially connected. A convolution kernel of each convolutional layer convolves an input picture or a feature map of a previous convolutional layer and outputs a feature map of a next layer. The last convolutional layer 3 is connected with the pooling layer 5. The pooling layer 5 is configured to perform sampling and dimension reduction processing on the feature map. An input of the fully connected layer 6 is a feature vector output by the pooling layer 5, and after the input feature vector is multiplied by a connection weight of the fully connected layer, a fixed-length feature vector is output. The global feature information of the pedestrian image to be detected is finally output through the output layer 7. The global feature information is a general overview of the pedestrian image and includes the height, body shape, gender, age group and the like of the pedestrian. It should be understood that a layer number corresponding to each layer of the input layer, convolutional layers, pooling layer, fully connected layer and output layer in the structure of the convolutional neural network is only an example and should not form a specific limit.

In 103, multiple pieces of intermediate feature information of the pedestrian image to be detected are extracted through the multiple convolutional layers of the convolutional neural network respectively, and the multiple pieces of intermediate feature information are merged as local feature information.

In an embodiment of the method for pedestrian re-identification of the disclosure, Step 103 may be implemented in, the following manner: the multiple pieces of intermediate feature information of the pedestrian image to be detected are extracted through the multiple convolutional layers of the convolutional neural network respectively; and local alignment is performed on the multiple pieces of intermediate feature information, and the multiple pieces of locally aligned intermediate feature information are merged to obtain the local feature information.

Figure 4:
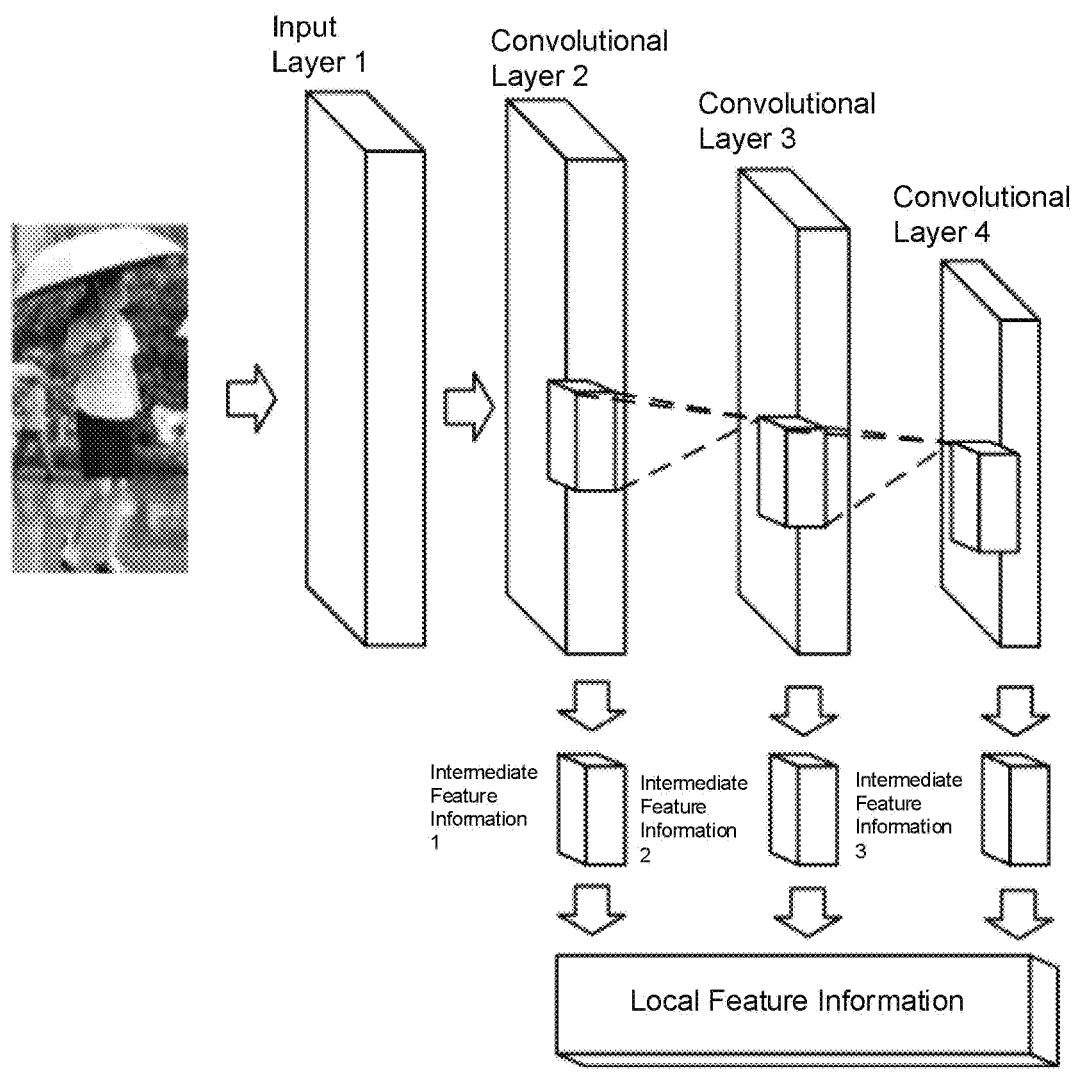
FIG. 4 is a schematic diagram of a process of extracting a local feature of a pedestrian image according to an embodiment of the disclosure.

The convolutional neural network in Step 103 and the convolutional neural network in Step 102 are actually the same network. Referring to FIG. 4, FIG. 4 is a schematic diagram of a process of extracting a local feature of a pedestrian image according to an embodiment of the disclosure. Each convolutional layer of the convolutional neural network extracts the intermediate feature information of the pedestrian image. For example, the convolutional layer 1 extracts intermediate feature information 1, the convolutional layer 2 extracts intermediate feature information 2, and the convolutional layer 3 extracts intermediate feature information 3. Then, the intermediate feature information 1, the intermediate feature information 2 and the intermediate feature information 3 are merged to obtain the local feature information.

Figure 5:
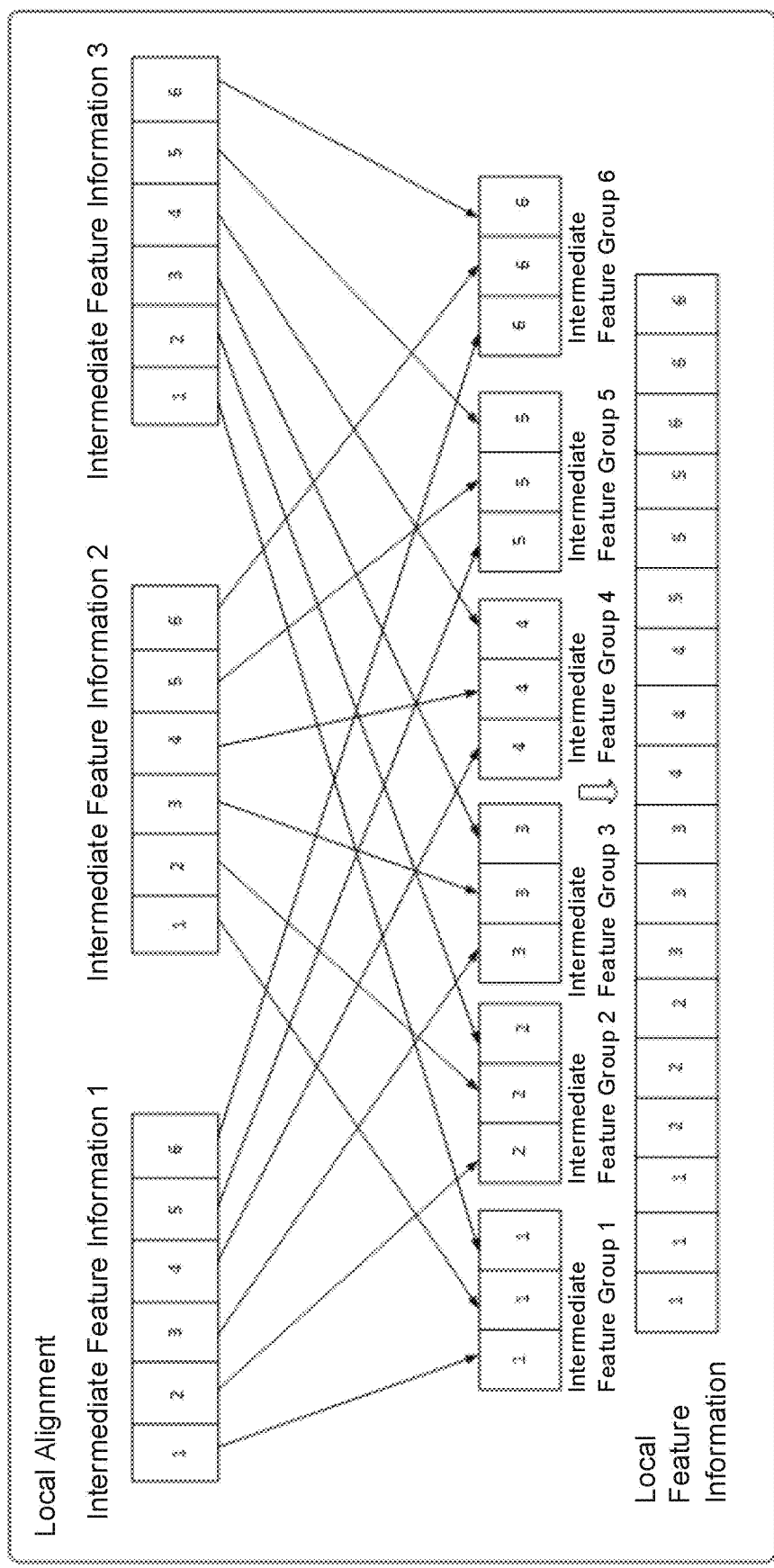
FIG. 5 is a schematic diagram of a local alignment process of intermediate features according to an embodiment of the disclosure.

Furthermore, the operation that local alignment is performed on the multiple pieces of intermediate feature information and the multiple pieces of locally aligned intermediate feature information are merged to obtain the local feature information may be implemented in the following manner: each piece of intermediate feature information of n pieces of intermediate feature information a1, a2, ... an is divided into m blocks, thereby obtaining n pieces of blocked intermediate feature information {a11, a12, ... a1m}, {a21, a22, ... a2m}, ... {an1, an2, ... anm}, both n and m being positive integers; m intermediate feature groups {a11, a21, ... an1}, {a12, a22, ... an2}, ... {a1m, a2m, ... anm} are determined; and the m intermediate feature groups are merged as the local feature information {{a11, a21, ... an1}, {a12, a22, ... an2}, ... {a1m, a2m, ... anm}}. A local alignment process is further described based on FIG. 5. A tensor corresponding to each piece of intermediate feature information is divided into 6 blocks, the blocks with the same serial number are combined to obtain 6 intermediate feature groups, and the 6 intermediate feature groups are finally merged to obtain the local feature information.

The multiple pieces of intermediate feature information are locally aligned for the purpose of fusing features representing the same part and avoiding confusion caused by mutual fusion of features representing different parts. The local alignment operation is executed on the multiple pieces of intermediate feature information, so, that the identification capability of the local feature information for the pedestrian image is improved.

Optionally, the local feature information obtained by merging is convolved through the convolution kernel to obtain the convolved local feature information. The convolution kernel may be a 1*1 convolution kernel. Compared with local feature information that is not convolved, the convolved local feature information has higher performance of mutual fusion of multiple feature blocks therein, and its identification capability for the pedestrian image is also correspondingly improved.

Optionally, the local feature information locally expresses the pedestrian image to be detected. The local feature information includes the hairstyle of the pedestrian, whether earrings are worn or not, whether glasses are worn or not, the color and style of the jacket, the color and style of the bottoms, the color and style of the shoes, whether a handbag is carried or not, whether a schoolbag is carried or not, whether an umbrella is held or not, and the like. It should be understood that the examples of the local feature information are only exemplary and should not form specific limits.

In 104, the global feature information and the local feature information are assigned as a classification feature of the pedestrian image to be detected, and a classification result of the pedestrian image to be detected is determined according to the classification feature.

In a specific embodiment of the method for pedestrian re-identification of the disclosure, the operation that the global feature information and the local feature information are assigned as the classification feature of the pedestrian image to be detected and the classification result of the pedestrian image to be detected is determined according to the classification feature may be implemented in the following manner: a first classification result of the pedestrian image to be detected is determined by use of a first classification function based on the global feature information; a second classification result of the pedestrian image to be detected is determined by use of a second classification function based on the local feature information; and a final classification result of the pedestrian image to be detected is determined based on the first classification result and the second classification result.

Specifically, the operation that the final classification result of the pedestrian image to be detected is determined based on the first classification result and the second classification result may be implemented through a formula $y=f(result_r, result_v)$, where $result_r$ is the first classification result of the pedestrian image to be detected, the first classification result being determined based on the global feature information, and $result_v$ is the second classification result of the pedestrian image to be detected, the second classification result being determined based on the local feature information.

Furthermore, $$f(result_r, result_v) = \frac{w_r}{W_r + W_V} result_r + \frac{w_V}{W_r + W_V} result_v,$$

where
$W_r$ is a weight of the first classification result, and $W_V$ is a weight of the second classification result. The final classification result of the pedestrian image to be detected is determined by both the first classification result and the second classification result. A contribution of the first classification result to the final classification result is determined by $$\frac{W_r}{W_r + W_V},$$

and a contribution of the second classification result to the final classification result is determined by $$\frac{W_V}{W_r + W_V}.$$

Optionally, the first classification function and the second classification function may be the same classification function, and the classification function may be a softmax classification function. Specifically, the softmax classification function may be $$P = \frac{e^{f_i}}{\sum_{j=0}^{N} e^{f_i}},$$

where P represents a classification probability of the pedestrian image to be detected, $f_i$ represents the global feature information when the function is adopted as the first classification function, and $f_i$ represents the local feature information when the function is adopted as the second classification function.

Optionally, a first difference value between the first classification result and a practical classification result is determined by use of a cross-entropy loss function. A second difference value between the second classification result and the practical classification result is determined by use of the cross-entropy loss function. A model parameter of the convolutional neural network is regulated based on the first difference value and the second difference value.

A formula of the cross-entropy loss function is $H(p,q)=-\Sigma_x p(x)\log q(x)$, where $q(x)$ is a classification probability, predicted by the convolutional neural network, of the pedestrian image to be detected, $p(x)$ is a practical classification probability of the pedestrian image to be detected, and $H(p,q)$ is a cross entropy between $q(x)$ and $p(x)$ and may represent a difference between a practical classification probability and predicted classification probability of a real sample label.

Optionally, the convolutional neural network adopted in the method for pedestrian re-identification embodiment of the disclosure may be a convolutional neural network such as ResNet, VGGNet and GoogLeNet. It should be understood that the key of the disclosure is not a type of the adopted convolutional neural network and the types listed here are only examples and should not form specific limits.

Figure 6:
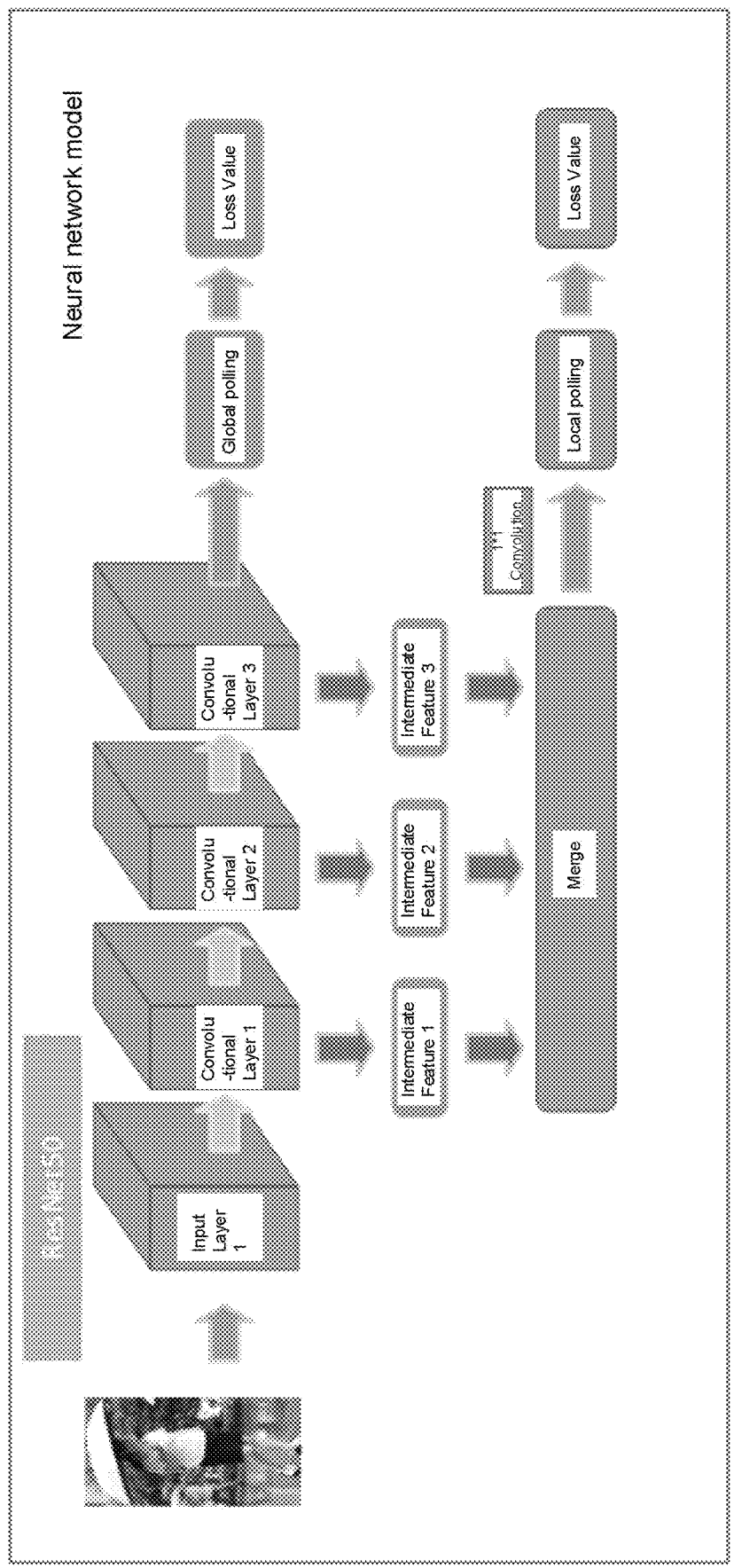
FIG. 6 is a schematic diagram of a process of extracting a feature of a pedestrian image according to an embodiment of the disclosure.

The method for pedestrian re-identification of the disclosure will be summarized below based on FIG. 6. FIG. 6 is a schematic diagram of a process of extracting a feature of a pedestrian image according to an embodiment of the disclosure. First, horizontally, the global feature information of the pedestrian image to be detected is extracted through the multiple convolutional layers. Second, longitudinally, the multiple pieces of intermediate feature information of the pedestrian image to be detected are extracted through the multiple convolutional layers respectively, and the multiple pieces of intermediate feature information are merged as the local feature information, the multiple pieces of intermediate feature information each corresponds to a respective one of the multiple convolutional layers. Third, the global feature information is globally pooled, the local feature information is locally pooled, then the first classification result is determined by use of the classification function based on the global feature information, the second classification result is determined by use of the classification function based on the local feature information, and finally, the difference value between the first classification result and the practical classification result and the difference value between the second classification result and the practical classification result are determined.

Based on the method for pedestrian re-identification provided in the embodiment of the disclosure, the pedestrian image to be detected is acquired, the global feature information of the pedestrian image to be detected is extracted through the multiple convolutional layers of the convolutional neural network, the multiple pieces of intermediate feature information of the pedestrian image to be detected are extracted through the multiple convolutional layers of the convolutional neural network, the multiple pieces of intermediate information are merged as the local feature information, finally; the global feature information and the local feature information are assigned as the classification feature of the pedestrian image to be detected, and the classification result of the pedestrian image to be detected is determined according to the classification feature. By implementing the method for pedestrian re-identification embodiment of the disclosure, features of multiple layers and multiple scales of the pedestrian image are fused, and a more identifiable feature is obtained based on a global feature and local feature of the pedestrian image, so that the pedestrian re-identification accuracy is improved.

Figure 7:
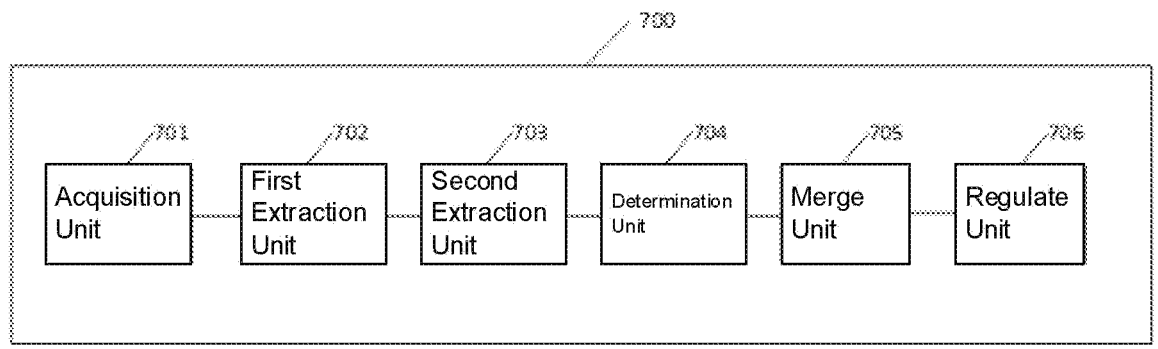
FIG. 7 is a structure diagram of an apparatus for pedestrian re-identification according to an embodiment of the disclosure.

An embodiment of the disclosure also provides an apparatus for pedestrian re-identification, which may be configured to implement each method for pedestrian re-identification embodiment of the disclosure. Specifically, referring to FIG. 7, FIG. 7 is a structure diagram of an apparatus for pedestrian re-identification according to an embodiment of the disclosure. A system 700 of the embodiment includes:

an acquisition unit 701, configured to acquire a pedestrian image to be detected;

a first extraction unit 702, configured to extract global feature information of the pedestrian image to be detected through multiple convolutional layers of a convolutional neural network;

a second extraction unit 703, configured to extract multiple pieces of intermediate feature information of the pedestrian image to be detected through the multiple convolutional layers of the convolutional neural network respectively and merge the multiple pieces of intermediate feature information as local feature information, the multiple pieces of intermediate feature information each corresponds to one of the multiple convolutional layers; and a determination unit 704, configured to, assign the global feature information and the local feature information as a classification feature of the pedestrian image to, be detected and determine a classification result of the pedestrian image to be detected according to the classification feature.

Figure 8:
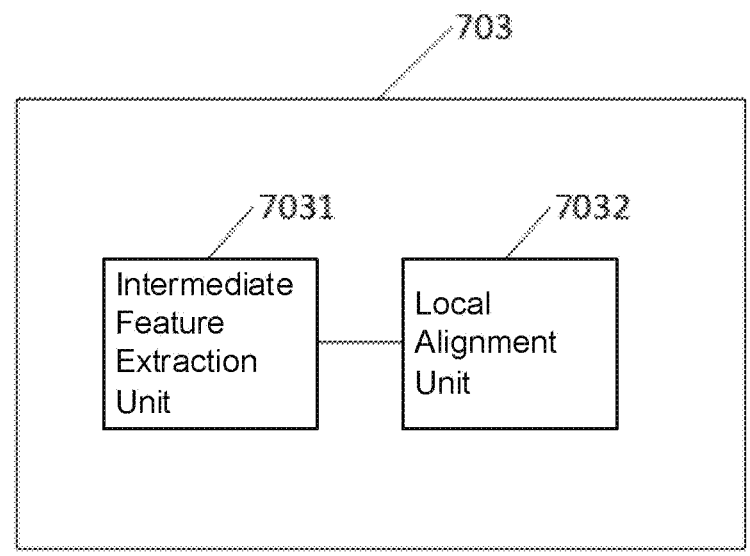
FIG. 8 is a structure diagram of a second extraction unit according to an embodiment of the disclosure.

In a specific implementation mode, referring to FIG. 8, FIG. 8 is a structure diagram of a second extraction unit according to an embodiment of the disclosure. The second extraction unit 703 includes an intermediate feature extraction unit 7031 and a local alignment unit 7032.

The intermediate feature extraction unit 7031 is configured to extract multiple pieces of intermediate feature information of the pedestrian image to be detected through the multiple convolutional layers of the convolutional neural network respectively.

The local alignment unit 7032 is configured to perform local alignment on the multiple pieces of intermediate feature information and merge the multiple pieces of locally aligned intermediate feature information as the local feature information.

Figure 9:
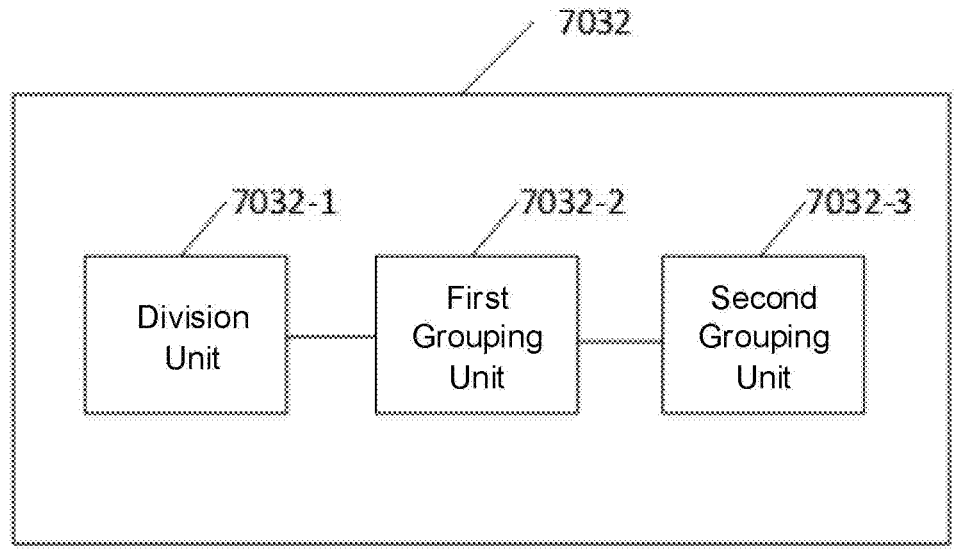
FIG. 9 is a structure diagram of a local alignment unit according to an embodiment of the disclosure.

Furthermore, referring to FIG. 9, FIG. 9 is a structure diagram of a local alignment unit according to an embodiment of the disclosure. The local alignment unit 7032 includes a division unit 7032-1, a first grouping unit 7032-2 and a second grouping unit 7032-3. The operation that local alignment is performed on the multiple pieces of intermediate feature information and the multiple pieces of locally aligned intermediate feature information are merged to obtain the local feature information may be implemented in the following manner: the division unit 7032-1 is configured to divide each piece of intermediate feature information of n pieces of intermediate feature information a1, a2, . . . an into m blocks, thereby obtaining n pieces of blocked intermediate feature information {a11, a12, . . . a1m}, {a21, a22, . . . a2m}, . . . {an1, an2, . . . anm}, both n and m being positive integers; the first grouping unit 7032-2 is configured to determine m intermediate feature groups {a11, a21, . . . an1}, {a12, a22, . . . an2}, . . . {a1m, a2m, . . . anm}; and the second grouping unit 7032-3 is configured to merge the m intermediate feature groups as the local feature information {{a11, a21, . . . an1}, {a12, a22, . . . an2}, . . . {a1m, a2m, . . . anm}}. A local alignment process is further described based on FIG. 5. A tensor corresponding to each piece of intermediate feature information is divided into 6 blocks, the blocks with the same serial number are combined to obtain 6 intermediate feature groups, and the 6 intermediate feature groups are finally merged to obtain the local feature information.

In a specific implementation mode, the determination unit 704 is configured to:

determine a first classification result of the pedestrian image to be detected by use of a first classification function based on the global feature information;

determine a second classification result of the pedestrian image to be detected by use of a second classification function based on the local feature information; and determine a final classification result of the pedestrian image to be detected based on the first classification result and the second classification result.

Optionally, the apparatus further includes a regulation unit 706. The regulation unit 706 is configured to determine a first difference value between the first classification result and a practical classification result by use of a cross-entropy loss function, determine a second difference value between the second classification result and the practical classification result by use of the cross-entropy loss function and regulate a model parameter of the convolutional neural network based on the first difference value and the second difference value.

In a specific embodiment of the apparatus for pedestrian re-identification of the disclosure, the pedestrian image to be detected may be an image including one or more pedestrians. The pedestrian image to be detected may be a pedestrian image with rectangular box labels or without any rectangular box label. The pedestrian image with the rectangular box labels is shown in FIG. 2. FIG. 2 is a pedestrian image with rectangular box labels according to an embodiment of the disclosure. It may be seen from FIG. 2 that the pedestrian image with the rectangular box labels is an image where pedestrians in the image are labeled with rectangular boxes. Using the pedestrian image with the rectangular box labels as the pedestrian image to, be detected makes it convenient to rapidly recognize positions of the pedestrians in the pedestrian image in the image through the convolutional neural network. If the pedestrian image to be detected is a pedestrian image without any rectangular box label, it is necessary to perform positioning processing on the pedestrians in the pedestrian image to be detected at first through the convolutional neural network.

Optionally, the acquired pedestrian image to be detected may be a static picture, such as a picture in a common format like JPEG; TIFF, BMP, GIF, PNG and RAW. The format of the picture is not limited in the disclosure. In addition, the pedestrian image to be detected may also be a frame captured from a video stream or a picture in an image sequence.

In a specific embodiment of the apparatus for pedestrian re-identification of the disclosure, the convolutional neural network is constructed. The global feature information of the pedestrian image to be detected may be extracted through the multiple convolutional layers of the convolutional neural network. A structure of the convolutional neural network refers to FIG. 3. The convolutional neural network includes an input layer 1, three convolutional layers 2 to 4, a pooling layer 5, a fully connected layer 6 and an output layer 7, which are sequentially connected. A convolution kernel of each convolutional layer convolves an input picture or a feature map of a previous convolutional layer and outputs a feature map of a next layer. The last convolutional layer 3 is connected with the pooling layer 5. The pooling layer 5 is configured to perform sampling and dimension reduction processing on the feature map. An input of the fully connected layer 6 is a feature vector output by the pooling layer 5, and after the input feature vector is multiplied by a connection weight of the fully connected layer, a fixed-length feature vector is output. The global feature information of the pedestrian image to be detected is finally output through the output layer 7. The global feature information is a general overview of the pedestrian image and includes the height, body shape, gender, age group and the like of the pedestrian. It should be understood that a layer number corresponding to each layer of the input layer, convolutional layers, pooling layer, fully connected layer and output layer in the structure of the convolutional neural network is only an example and should not form a specific limit.

The multiple pieces of intermediate feature information of the pedestrian image to be detected are extracted, the multiple pieces of intermediate feature information are locally aligned, and the multiple pieces of locally aligned intermediate feature information are merged to obtain the local feature information.

The convolutional neural networks adopted for the first extraction unit 702 and the second extraction unit 703 are actually the same network. Referring to FIG. 4, FIG. 4 is a schematic diagram of a process of extracting a local feature of a pedestrian image according to an embodiment of the disclosure. Each convolutional layer of the convolutional neural network extracts the intermediate feature information of the pedestrian image. For example, the convolutional layer 1 extracts intermediate feature information 1, the convolutional layer 2 extracts intermediate feature information 2, and the convolutional layer 3 extracts intermediate feature information 3. Then, the intermediate feature information 1, the intermediate feature information 2 and the intermediate feature information 3 are merged to obtain the local feature information.

The multiple pieces of intermediate feature information are locally aligned for purposes of fusing features representing the same part and avoiding confusion caused by mutual fusion of features representing different parts. The local alignment operation is executed on the multiple pieces of intermediate feature information, so that the identification capability of the local feature information for the pedestrian image is improved.

Optionally, the local feature information obtained by merging is convolved through the convolution kernel to obtain the convolved local feature information. The convolution kernel may be a 1*1 convolution kernel. Compared with local feature information that is not convolved, the convolved local feature information has higher performance of mutual fusion of multiple feature blocks therein, and its identification capability for the pedestrian image is also correspondingly improved.

Optionally, the local feature information locally expresses the pedestrian image to be detected. The local feature information includes the hairstyle of the pedestrian, whether earrings are worn or not, whether glasses are worn or not, the color and style of the jacket, the color and style of the bottoms, the color and style of the shoes, whether a handbag is carried or not, whether a schoolbag is carried or not, whether an umbrella is held or not, and the like. It should be understood that the examples of the local feature information are only exemplary and should not form specific limits.

Specifically, the operation that the final classification result of the pedestrian image to be detected is determined based on the first classification result and the second classification result may be implemented through a formula $y=f(result_r, result_v)$, where result$_r$ is the first classification result of the pedestrian image to be detected, the first classification result being determined based on the global feature information, and result$_v$ is the second classification result of the pedestrian image to be detected, the second classification result being determined based on the local feature information.

Furthermore, $$f(result_r, result_v) = \frac{W_r}{W_r + W_V} result_r + \frac{W_V}{W_r + W_V} result_v,$$

where W$_r$ is a weight of the first classification result, and W$_V$ is a weight of the second classification result. The final classification result of the pedestrian image to be detected is determined by both the first classification result and the second classification result A contribution of the first classification result to the final classification result is determined by $$\frac{W_r}{W_r + W_V},$$

and a contribution of the second classification result to the final classification result is determined by $$\frac{W_V}{W_r + W_V}.$$

Optionally, the first classification function and the second classification function may be the same classification function, and the classification function may be a softmax classification function. Specifically, the softmax classification function may be $$P = \frac{e^{f_i}}{\sum_{j=0}^{N} e^{f_j}},$$

where P represents a classification probability of the pedestrian image to be detected, $f_i$ represents the global feature information when the function is adopted as the first classification function, and $f_i$ represents the local feature information when the function is adopted as the second classification function.

Optionally, a first difference value between the first classification result and a practical classification result is determined by use of a cross-entropy loss function. A second difference value between the second classification result and the practical classification result is determined by use of the cross-entropy loss function. A model parameter of the convolutional neural network is regulated based on the first difference value and the second difference value.

A formula of the cross-entropy loss function is H(p,q)= −Σ$_x$p(log q(x), where q(x) is a classification probability, predicted by the convolutional neural network, of the pedestrian image to be detected, p(x) is a practical classification probability of the pedestrian image to be detected, and H(p,q) is a cross entropy between q(x) and p(x) and may represent a difference between a practical classification probability and predicted classification probability of a real sample label.

Optionally, the convolutional neural network adopted in the method for pedestrian re-identification embodiment of the disclosure may be a convolutional neural network such as ResNet, VGGNet and GoogLeNet. It should be understood that the key of the disclosure is not a type of the adopted convolutional neural network and the types listed here are only examples and should not form specific limits.

Referring to Table 1, Table 1 shows test results of pedestrian re-identification of the disclosure on a market 1501 dataset. In the table, mAP and the pedestrian re-identification accuracy of Rank1, Rank5 and Rank10 are recorded, wherein mAP represents average accuracy. Meanings of Rank1, Rank5 and Rank10 will be explained below with Rank5 as an example. A pedestrian query image is provided. The convolutional neural network identifies 5 pedestrian images most similar to the pedestrian query image from a pedestrian image library, the 5 pedestrian images being called Rank5 The meanings of Rank1 and Rank10 are understood in the same manner. It may be seen from the table that, no matter whether a query manner is Single query (for a pedestrian image to be detected of the same Identifier (ID), only one image is adopted for matching in the image library) or Muilty query (for a pedestrian image to be detected of the same ID, multiple images are adopted for matching in the image library), when the method for pedestrian re-identification of the disclosure is adopted, the identification accuracy of Rank1, Rank5 and Rank10 exceeds 90% and the average accuracy is 80%, and the identification accuracy of a pedestrian re-identification solution of a conventional art is obviously lower than the solution of the disclosure. Therefore, pedestrian feature information obtained by fusing features of different layers and different scales of a pedestrian image and combining global feature information of the pedestrian image and local feature information of different layers is more identifiable, so that the identification accuracy is improved.

TABLE 1

Test Results of Pedestrian Re-identification of the Disclosure on Market1501 dataset

| Query manner | Accuracy Index | | | |
|---|---|---|---|---|
| | mAP | Rank1 | Rank5 | Rank10 |
| Single query (the disclosure) | 79.11% | 92.99% | 97.45% | 98.28% |
| Muilty query (the disclosure) | 85.25% | 94.27% | 96.85% | 97.62% |
| Single query (conventional art) | 60.15% | 70.85% | 72.68% | 75.88% |
| Muilty query (conventional art) | 62.44% | 72.75% | 73.34% | 76.44% |

Based on the apparatus for pedestrian re-identification provided in the embodiment of the disclosure, the apparatus for pedestrian re-identification acquires the pedestrian image to be detected, extracts the global feature information of the pedestrian image to be detected through the multiple convolutional layers of the convolutional neural network, extracts the multiple pieces of intermediate feature information of the pedestrian image to be detected through the multiple convolutional layers of the convolutional neural network, merges the multiple pieces, of intermediate information as the local feature information, finally, assigns the global feature information and the local feature information as the classification feature of the pedestrian image to be detected and determines the classification result of the pedestrian image to be detected according to the classification feature. By implementing the apparatus for pedestrian re-identification embodiment of the disclosure, features of multiple layers and multiple scales of the pedestrian image are fused, and a more identifiable feature is, obtained based on a global feature and local feature of the pedestrian image, so that the pedestrian re-identification accuracy is improved.

In addition, an embodiment of the disclosure provides an electronic device, which may include the method for pedestrian re-identification of any abovementioned embodiment of the disclosure. Specifically, the electronic device may be a device such as a terminal device or a server.

An embodiment of the disclosure also provides another electronic device, which includes:
a memory, configured to store an executable instruction; and
a processor, configured to communicate with the memory to execute the executable instruction, thereby completing the operations in the method for pedestrian re-identification of any abovementioned embodiment of the disclosure.

Figure 10:
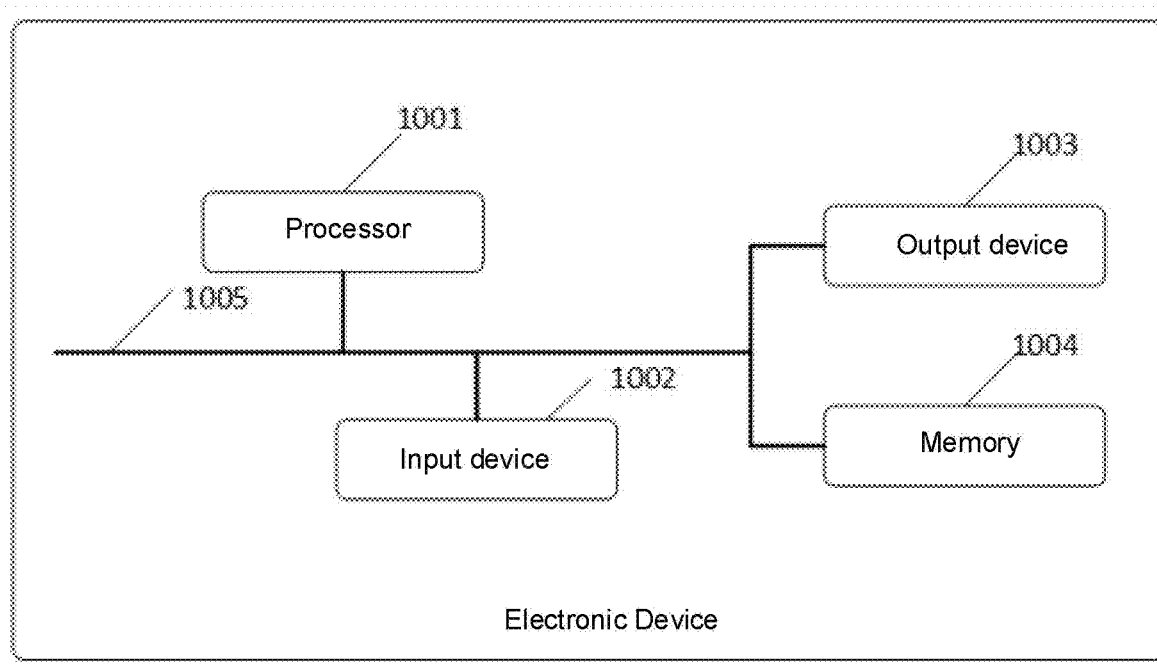
FIG. 10 is a structure diagram of an apparatus for pedestrian re-identification according to an embodiment of the disclosure.

FIG. 10 is a structure block diagram of an electronic device according to an embodiment of the disclosure. A structure diagram of an electronic device, such as a terminal device or a server, suitable for implementing, the embodiment of the disclosure is shown below with reference to FIG. 10. As shown in FIG. 10, the electronic device includes one or more processors 1001, one or more input devices 1002, one or more output devices 1003 and a memory 1004. The processor 1001, the input device 1002, the output device 1003 and the memory 1004 are connected through a bus 1005. The memory 1002 is configured to store an instruction. The processor 1001 is configured to execute the instruction stored in the memory 1004. The processor 1001 is configured to call the program instruction to execute the operations of:
acquiring a pedestrian image to be detected;
extracting global feature information of the pedestrian image to be detected through multiple convolutional layers of a convolutional neural network;
extracting multiple pieces of intermediate feature information of the pedestrian image to be detected through the multiple convolutional layers of the convolutional neural network respectively, and merging the multiple pieces of intermediate feature information as local feature information, the multiple pieces of intermediate feature information each corresponds to one of the multiple convolutional layers; and
assigning the global feature information and the local feature information as a classification feature of the pedestrian image to be detected, and determining a classification result of the pedestrian image to be detected according to the classification feature.

It should be understood that, in the embodiment of the disclosure, the processor 1001 may be a Central Processing Unit (CPU), and the processor may also be another universal processor, a Digital Signal Processor (DSP), an Application Specific Integrated Circuit (ASIC), a Field-Programmable Gate Array (FPGA) or another programmable logic device, a discrete gate or a transistor logic device, a discrete hardware component and the like. The universal processor may be a microprocessor, or the processor may also be any conventional processor and the like.

The input device 1002 may include a camera. The camera has an image file storage function and an image file transmission function. The output device 1003 may include a display, a hard disk, a U disk and the like.

The memory 1004 may include a read-only memory and a random access memory, and provides an instruction and data for the processor 1001. A part of the memory 1004 may further include a non-volatile random access memory. For example, the memory 1004 may further store information of a device type.

During specific implementation, the processor 1001, input device 1002 and output device 1003 described in the embodiment of the disclosure may execute the implementation modes described in each embodiment of the method and system for pedestrian re-identification provided in the embodiments of the disclosure, and elaborations are omitted herein.

Another embodiment of the disclosure provides a computer-readable storage medium. The computer-readable storage medium stores a computer program. The computer program includes a program instruction. The program instruction is executed by a processor to implement the operations of: acquiring a pedestrian image to be detected; extracting global feature information of the pedestrian image to be detected through multiple convolutional layers of a convolutional neural network; extracting multiple pieces of intermediate feature information of the pedestrian image to be detected through the multiple convolutional layers of the convolutional neural network, and merging the multiple pieces of intermediate information as local feature information, the multiple pieces of intermediate feature information each corresponds to one of the multiple convolutional layers: and assigning the global feature information and the local feature information as a classification feature of the pedestrian image to be detected, and determining a classification result of the pedestrian image to be detected according to the classification feature.

What is claimed is:
1. A method for pedestrian re-identification, comprising:
acquiring a pedestrian image to be detected;
extracting global feature information of the pedestrian image to be detected through multiple convolutional layers of a convolutional neural network;
extracting multiple pieces of intermediate feature information of the pedestrian image to be detected through the multiple convolutional layers of the convolutional neural network respectively, and performing local alignment on the multiple pieces of intermediate feature information, and merging multiple pieces of locally aligned intermediate feature information as the local feature information, wherein the multiple pieces of intermediate feature information each corresponds to one of the multiple convolutional layers; and
assigning the global feature information and the local feature information as a classification feature of the pedestrian image to be detected, and determining a classification result of the pedestrian image to be detected according to the classification feature.

2. The method as claimed in claim 1, wherein performing local alignment on the multiple pieces of intermediate feature information, and merging multiple pieces of locally aligned intermediate feature information as the local feature information comprises:
dividing each piece of intermediate feature information of n pieces of intermediate feature information a1, a2, . . . an into m blocks, to obtain n pieces of blocked intermediate feature information {a11, a12, ... a1m}, {a21, a22, ... a2m}, {an1, an2, ... anm}, both n and m being positive integers;

determining m intermediate feature groups {a11, a21, ... an1}, {a12, a22, ... an2}, {a1m, a2m, ... anm}; and merging the m intermediate feature groups as the local feature information {{a11, a21, ... an1}, {a12, a22, ... an2}, {a1m, a2m, ... anm}}.

3. The method as claimed in claim 2, further comprising: convolving the local feature information through a convolution kernel, to obtain convolved local feature information.

4. The method as claimed in claim 1, wherein assigning the global feature information and the local feature information as the classification feature of the pedestrian image to be detected, and determining the classification result of the pedestrian image to be detected according to the classification feature comprises:

determining a first classification result of the pedestrian image to be detected by use of a first classification function based on the global feature information;

determining a second classification result of the pedestrian image to be detected by use of a second classification function based on the local feature information; and determining a final classification result of the pedestrian image to be detected base on the first classification result and the second classification result.

5. The method as claimed in claim 4, further comprising:

determining a first difference value between the first classification result and a practical classification result by use of a cross-entropy loss function;

determining a second difference value between the second classification result and the practical classification result by use of the cross-entropy loss function; and regulating a model parameter of the convolutional neural network based on the first difference value and the second difference value.

6. An apparatus for pedestrian re-identification, comprising:

an acquisition unit, configured to acquire a pedestrian image to be detected;

a first extraction unit, configured to extract global feature information of the pedestrian image to be detected through multiple convolutional layers of a convolutional neural network;

a second extraction unit, comprising an intermediate feature extraction unit and a local alignment unit, wherein the intermediate feature extraction unit is configured to extract multiple pieces of intermediate feature information of the pedestrian image to be detected through the multiple convolutional layers of the convolutional neural network respectively, and the local alignment unit is configured to perform local alignment on the multiple pieces of intermediate feature information and merge the multiple pieces of locally aligned intermediate feature information as the local feature information, wherein the multiple pieces of intermediate feature information each corresponds to one of the multiple convolutional layers; and a determination unit, configured to assign the global feature information and the local feature information as a classification feature of the pedestrian image to be detected and determine a classification result of the pedestrian image to be detected according to the classification feature.

7. An electronic device, comprising a processor and a memory, wherein the memory is configured to store an application program code, and the processor is configured to perform the application program code to implement a method for pedestrian re-identification, the method for pedestrian re-identification, comprising:

acquiring a pedestrian image to be detected;

extracting global feature information of the pedestrian image to be detected through multiple convolutional layers of a convolutional neural network;

extracting multiple pieces of intermediate feature information of the pedestrian image to be detected through the multiple convolutional layers of the convolutional neural network respectively, and performing local alignment on the multiple pieces of intermediate feature information, and merging multiple pieces of locally aligned intermediate feature information as the local feature information, wherein the multiple pieces of intermediate feature information each corresponds to one of the multiple convolutional layers; and assigning the global feature information and the local feature information as a classification feature of the pedestrian image to be detected, and determining a classification result of the pedestrian image to be detected according to the classification feature.

* * * * *